(12) United States Patent
Kempfert (10) Patent No.: US 9,499,776 B2
(45) Date of Patent: Nov. 22, 2016

(54) SYSTEM AND METHOD FOR ALL-IN-ONE WORT PREPARATION

(71) Applicant: Noel Robert Kempfert, Prior Lake, MN (US)

(72) Inventor: Noel Robert Kempfert, Prior Lake, MN (US)

( * ) Notice: Subject to any disclaimer, the term of this patent is extended or adjusted under 35 U.S.C. 154(b) by 338 days.

(21) Appl. No.: 13/787,575

(22) Filed: Mar. 6, 2013

(65) Prior Publication Data

US 2014/0234482 A1 Aug. 21, 2014

Related U.S. Application Data

(60) Provisional application No. 61/765,612, filed on Feb. 15, 2013.

(51) Int. Cl.
  *C12C 13/10* (2006.01)
  *C12C 7/17* (2006.01)
  *C12C 7/22* (2006.01)

(52) U.S. Cl.
  CPC .............. *C12C 13/10* (2013.01); *C12C 7/17* (2013.01); *C12C 7/22* (2013.01)

(58) Field of Classification Search
  CPC ............ C12C 13/10; C12C 7/17; C12C 7/22
  USPC .................. 99/276, 277, 277.1, 278; 426/16
  See application file for complete search history.

(56) References Cited

U.S. PATENT DOCUMENTS

| | | | | |
|---|---|---|---|---|
| 3,113,027 A | * | 12/1963 | Learner ..................... | C12C 7/17 422/281 |
| 3,563,157 A | | 2/1971 | Lenz | |
| 3,622,465 A | * | 11/1971 | Orgel ....................... | C12N 1/26 435/248 |
| 4,302,331 A | * | 11/1981 | Condit, Jr. ........... | B01D 33/327 198/713 |
| 4,494,451 A | | 1/1985 | Hickey | |
| 4,653,388 A | | 3/1987 | Wilkinson | |
| 6,962,104 B1 | * | 11/2005 | Podlucky ............ | A47J 31/0615 99/275 |
| 8,141,477 B2 | | 3/2012 | Broderick | |
| 8,146,484 B2 | | 4/2012 | Blichmann | |
| 8,152,115 B2 | | 4/2012 | Blichmann | |
| 8,481,100 B2 | | 7/2013 | Blichmann et al. | |
| 2001/0024665 A1 | * | 9/2001 | Rao ....................... | A23L 1/2215 424/757 |
| 2007/0212776 A1 | * | 9/2007 | Darling ................... | A23J 1/002 435/289.1 |
| 2009/0173691 A1 | * | 7/2009 | Oklejas, Jr. .......... | B01D 61/025 210/637 |
| 2009/0285971 A1 | * | 11/2009 | Broderick ............... | C12C 7/065 426/627 |

FOREIGN PATENT DOCUMENTS

| | | |
|---|---|---|
| DE | 10150395 B4 | 7/2007 |
| WO | WO 0112773 | 2/2001 |

* cited by examiner

*Primary Examiner* — Dana Ross
*Assistant Examiner* — Kuangyue Chen
(74) *Attorney, Agent, or Firm* — Jonathan M. Rixen; Lemaire Patent Law Firm, P.L.L.C.

(57) ABSTRACT

The present invention provides a brewing system that includes a cooking vessel configured to heat a fluid in the cooking vessel; a grain container having a false bottom, wherein the grain container is configured to hold a grain bed, wherein the grain container includes a plurality of sieves that are configured to separate the grain bed into a plurality of grain layers, and wherein the grain container is configured to be placed within the cooking vessel; and a fluid-circulation system configured to transfer fluid heated by the cooking vessel into the grain container such that the transferred fluid contacts a top surface of the grain bed, filters through the grain bed and the plurality of sieves, and enters the cooking vessel, and wherein the fluid-circulation system is further configured to re-circulate the fluid that exits the cooking vessel via a drain back to the top surface of the grain bed.

13 Claims, 5 Drawing Sheets

SYSTEM AND METHOD FOR ALL-IN-ONE WORT PREPARATION

CROSS-REFERENCE TO RELATED APPLICATIONS

This application claims priority benefit under 35 U.S.C. §119(e) of U.S. Provisional Patent Application No. 61/765,612 filed Feb. 15, 2013 by Noel Kempfert, titled "SYSTEM AND METHOD FOR ALL-IN-ONE WORT PREPARATION," which is incorporated herein by reference in its entirety.

FIELD OF THE INVENTION

The present invention relates to beer-brewing systems and methods, and more particularly to devices and methods for all-in-one wort preparation including mashing, lautering, and boiling.

BACKGROUND OF THE INVENTION

Brewing beer generally involves two main stages: (1) preparing the wort (i.e., the unfermented precursor to beer that includes a liquid mixture of fermentable sugars obtained from grains), and (2) fermenting the wort to produce the beer. There are two main techniques used for preparing the wort: (1) extract-based brewing, and (2) all-grain brewing. In extract-based brewing, malt extract (a concentrated form of the fermentable sugars obtained from malted grains) is added directly to a brew kettle and boiled. Other ingredients like hops are then added directly to the brew kettle during the boil to complete the wort. In all-grain brewing, malted grains are first "mashed" to extract the sugars needed for fermentation, the extracted sugars (i.e., the wort) are then separated from the mashed grains in a process called "lautering", and finally, the separated wort is boiled while other ingredients like hops are added to the wort. Due to its relative ease, many novice home brewers use extract-brewing systems, while more advanced home brewers and commercial-scale breweries use all-grain brewing systems.

As used herein, "mashing" is the process of combining a mix of milled, malted grain and water and heating the mixture such that enzymes in the malted grain break down starch in the grain into sugars (typically maltose) to create the wort. The end product of mashing, which includes the mixture of wort and residual grain, is called a "mash".

As used herein, "lautering" is the process in which the mash is separated into its component parts of the wort and the residual grain. Lautering typically involves sparging (i.e., spraying or sprinkling) water through the mash to extract the wort out of the mash.

The mashing, lautering, and boiling stages of all-grain brewing are usually completed in separate containers or tuns (e.g., many commercial breweries use a mash tun for mashing, a lautering tun for lautering, and a brew kettle for boiling the wort), and the water used during mashing and lautering is often heated in yet another separate container. In conventional all-grain brewing systems, the mash tun requires some type of mixing device (e.g., a mash rake) that stirs the mash in order to prevent clumping of the mash and keep a uniform mash temperature. Small-scale micro-breweries, rather than using a mash tun for mashing and a separate lautering tun for lautering, often complete the mashing and lautering processes in a single mash/lauter tun. Systems that use a mash/lauter tun combination still generally require a separate container for heating water used during mashing and lautering and a separate brew kettle for boiling the wort.

U.S. Pat. No. 3,563,157 to Conrad Lenz (hereinafter, "Lenz"), titled "AUTOMATIC BREWING PLANT" issued Feb. 16, 1971, and is incorporated herein by reference. Lenz describes a brewing plant equipped with controls which automatically feed a set amount of mash to vessels, keep the mash in the vessels at closely controlled temperatures for predetermined times, transfer the mash between the vessels, and ultimately discharge it to a lautertub. The manifold control functions are distributed between a master control unit and auxiliary control mechanisms, each of which controls more than one aspect of the brewing process and is itself controlled by the master unit.

U.S. Pat. No. 4,494,451 to John F. Hickey (hereinafter, "Hickey"), titled "Brewing apparatus" issued Jan. 22, 1985, and is incorporated herein by reference. Hickey describes a brewing apparatus which comprises a first vessel including heating means, a second vessel including strainer means, a third vessel, and a valve means and pump arrangement by means of which the three vessels can be coupled as necessary for fluid transfer purposes so that the first vessel can be used firstly as a hot liquor tank to produce hot liquor which is transferred to the third vessel which serves firstly as a hot liquor container, from which in use the hot liquor is transferred to the second vessel wherein it is mashed with malt to produce a wort and which serves firstly as a mash tun, from which the wort is transferred to the first vessel therein to be heated with hops whereby the first vessel serves secondly as a brewing kettle from which the resultant brew is transferred to the third vessel which serves secondly as a fermenting vessel.

U.S. Pat. No. 4,653,388 to Noel R. Wilkinson (hereinafter, "Wilkinson"), titled "BREWING" issued Mar. 31, 1987, and is incorporated herein by reference. Wilkinson describes a brewing unit in which energy is saved by providing a mash tun, hot water tank and kettle in a single unit, by partially enclosing the mash tun with the tank and if necessary pre-heating the water supply to the tank by using the heat from wort coolers provided between the unit and fermentation tank; further improvements are provided by constructing the kettle as a combined kettle and whirlpool in a single chamber having a circular wall and a tangential inlet to the wall, a pump and wort boiler being in circuit with the kettle so that wort is continuously circulated through the boiler and tangential inlet to the kettle while the worts are boiled.

U.S. Pat. No. 8,141,477 to William Broderick (hereinafter, "Broderick"), titled "MASH/LAUTER TUN AND METHOD OF USE THEREOF" issued Mar. 27, 2012, and is incorporated herein by reference. Broderick describes a mash/lauter tun and method of converting grains to wort. The mash/lauter tun comprises a container with a double false bottom filter having two perforated plates disposed parallel with a space therebetween for receiving filtration media. The container further comprises thermometers extending to near the center of the tun and a rotating heat exchanger. In use, mash is loaded into the container and heated via the rotating heat exchanger by passing hot fluid through the rotating heat exchanger. The mash is then sparged by increasing pressure in the rotating heat exchanger above a threshold pressure via closure an outlet valve of the heat exchanger. The wort then passes through the double false bottom filter and is subsequently transferred to a brew kettle for boiling.

PCT Application PCT/AT00/00220 (published as WO 01/12773 A2) to Beer-Lilly Brauereianlagen Handelsges M.

B. H (hereinafter, "Beer-Lilly"), titled "WORT COPPER" published Feb. 22, 2001, and is incorporated herein by reference. Beer-Lilly describes a wort copper having floor-heating and is suitable for the preparation of wort and is characterized by the fact that the vessel is provided with a removable vat (17) for receiving mash and subsequently hops having a sieve bottom (21) to allow the wort to flow into the wort copper (1), whereby the vat is provided (17) with a bottom drain pipe (5) and a head feed pipe (11) for stirring the mash.

German Patent DE10150395 B4 to Marie-Luise Frick et al. (hereinafter, "Frick et al."), titled "BEER BREWING BOILER HAS A PIPE SYSTEM, WITH WORT PLATES, WHERE THE LIQUID AND SOLID BREWING COMPONENTS ARE FORCED THROUGH BY A PUMP, WITHOUT USING STIRRERS OR FILTERS" issued Jul. 5, 2007, and is incorporated herein by reference.

There is a need for an improved system and method for all-grain brewing that combines the multiple stages of wort preparation into a single, all-in-one system.

SUMMARY OF THE INVENTION

In some embodiments, the present invention provides a brewing system that includes a cooking vessel configured to heat a fluid in the cooking vessel, wherein the cooking vessel includes a drain; a grain container having a false bottom, wherein the grain container is configured to hold a grain bed, wherein the grain container includes a plurality of sieves that are configured to separate the grain bed into a plurality of grain layers, and wherein the grain container is configured to be placed within the cooking vessel; and a fluid-circulation system configured to circulate fluid in the brewing system, wherein the circulation of the fluid includes a transfer of the fluid heated by the cooking vessel into the grain container such that the transferred fluid contacts a top surface of the grain bed, filters through the grain bed and the plurality of sieves, and enters the cooking vessel via the false bottom of the grain container, and wherein the circulation of the fluid further includes a re-circulation of the fluid that exits the cooking vessel via the drain back to the top surface of the grain bed.

In some embodiments, the present invention provides a method for preparing wort that includes providing a cooking vessel having a drain; adding a fluid to the cooking vessel; heating the fluid in the cooking vessel; providing a grain container having a false bottom; providing a plurality of sieves; loading a grain bed and the plurality of sieves into the grain container such that the grain bed is separated by the plurality of sieves into a plurality of grain layers; placing the grain container into the cooking vessel; and circulating the fluid, wherein the circulating of the fluid includes: transferring the fluid heated by the cooking vessel into the grain container such that the transferred fluid contacts a top surface of the grain bed, filters through the grain bed and the plurality of sieves, and enters the cooking vessel via the false bottom of the grain container, and re-circulating the fluid that exits the cooking vessel via the drain back to the top surface of the grain bed.

DETAILED DESCRIPTION OF THE INVENTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1A:
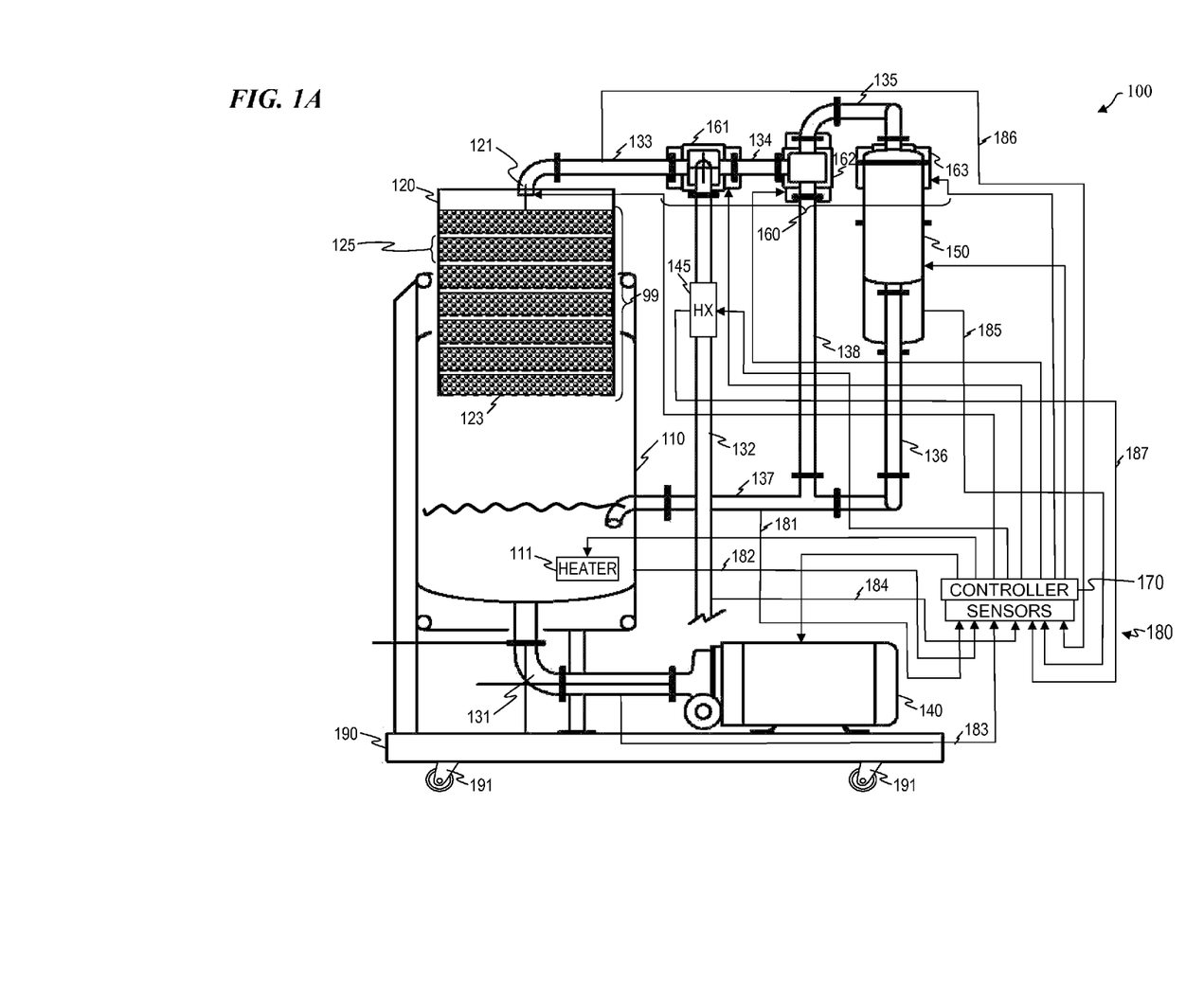
FIG. 1A is a schematic diagram of a wort-preparation system 100.

FIG. 1A is a schematic diagram of a wort-preparation system 100. System 100 produces wort in an all-in-one process that combines mashing and lautering and allows for wort boiling to be conducted in the same system 100. In some embodiments, system 100 includes a cooking vessel 110 and a grain container 120. In some embodiments, grain container 120 is configured to hold a grain bed 99 during mashing and lautering. In some embodiments, system 100 combines the mashing and lautering stages of wort production into a single continuous process by sparging water heated by vessel 110 from a sparging device 121 (e.g., in some embodiments, a flow distributor such as provided by Vortex Environmental Technologies, Inc., www.vortexcal-gary.com/index.php/water-purification/the-vortex-distribu-tor) located above grain bed 99 down through grain bed 99 and then re-circulating the wort that drains out of the bottom of grain bed 99 back to sparging device 121 and thus back into grain bed 99. In some embodiments, grain bed 99 is separated into a plurality of layers by a plurality of successive sieves 125 (one of which is labeled on FIG. 1A) that are each configured to allow water/wort to pass through and configured to hold back the residual grain. In some embodiments, the residual grain that builds up on each successive sieve 125 in grain bed 99 forms a multi-stage filter cake that further filters out entrained particles from the wort as it is recirculated through grain bed 99. In some embodiments, the plurality of sieves 125 includes five (5) sieves. In some embodiments, the plurality of sieves 125 includes six (6) sieves. In some embodiments, the plurality of sieves 125 includes seven (7) sieves. In some embodiments, the plurality of sieves 125 includes eight (8) sieves. In some embodiments, the plurality of sieves 125 includes more than eight (8) sieves. In some embodiments, the plurality of sieves 125 includes less than five (5) sieves.

In some embodiments, mashing is achieved by heating the water that is sparged through grain bed 99 to a temperature necessary to cook the grains and thus release the fermentable sugars of the wort, while lautering occurs substantially simultaneously with the mashing due to the water combining with the fermentable sugars and passing through the plurality of successive sieves 125 that hold back the residual grain. In some embodiments, the water moving downward through grain bed 99 achieves a laminar flow that minimizes or avoids clumping of grain bed 99 during the mashing/lautering process without requiring a mixing device (e.g., a mash rake) such as used in conventional systems (conventional systems tend to have problems with the grain bed clumping and clogging the system and so conventional systems rely on mixing devices to break up the clumps—in some embodiments, the laminar flow of water/wort through grain bed 99 of the present invention minimizes grain disturbance that tends to produce grain clumping). In some embodiments, the laminar flow of water is achieved by a combination of the flow rate used to sparge the water into grain bed 99 and the depth of each of the plurality of layers of grain formed by the plurality of sieves 125 in container 120 (e.g., in some embodiments, the plurality of sieves 125 are separated from each other such that there is enough room between each sieve 125 for a layer of grain that is at least approximately 7.6 centimeters (cm) (approximately 3 inches) deep, and the water is sparged at a rate of approximately 19 liters/min (approximately 5 U.S. gallons-per-minute (gpm)).

In some embodiments, vessel 110 includes a heater 111 configured to provide the heat for mashing/lautering and/or the heat for boiling the wort. In some embodiments, heater 111 includes a heat exchanger that includes an external electrical heating coil or electrical induction or other electrical heating source. In some embodiments, heater 111 includes an electrical heating coil that is located within the walls of vessel 110. In some embodiments, heater 111 includes an electrical heating coil (properly insulated, of course) that is located inside of vessel 110. In some embodiments, heater 111 includes a 230-volt water-heater element. In some embodiments, heater 111 includes a 5500 Watt (W) 208/240 Volt electric heating element such as provided by Hayward (e.g., a Hayward CZXELE7623 heating element; www.amazon.com/Hayward-CZXELE7623-Electric-Heating-Element/dp/B005D218MM). In some embodiments, heater 111 includes a heat exchanger powered by other than an electrical heating coil (e.g., a natural-gas-fired heat exchanger).

In some embodiments, system 100 includes a heat exchanger (HX) 145 that is configured to cool the wort. In some embodiments, HX 145 is a plate heat exchanger (e.g., a plate heat exchanger such as provided by Alfa Laval; www.alfalaval.com/products-and-solutions/plate-heat-exchangers/Pages/Plate-heat-exchangers.aspx) and the wort is pumped across HX 145 by pump 140 during cooling.

In some embodiments, vessel 110 is a substantially hollow cylinder-shaped vessel that includes an open top such that a grain container 120 can be placed inside vessel 110. In some embodiments, vessel 110 is substantially hollow and has a shape other than a cylinder. In some embodiments, vessel 110 has a closed bottom that includes a drain for removing wort from vessel 110. In some embodiments, vessel 110 is made of stainless steel. In some embodiments, vessel 110 is made of any other suitable material. In some embodiments, vessel 110 has a capacity of approximately 61 liters (approximately 16 U.S. gallons). In some embodiments, vessel 110 has a capacity of approximately 200 liters (approximately 53 U.S. gallons). In some embodiments, vessel 110 has a capacity of approximately 500 liters (approximately 132 U.S. gallons). In some embodiments, vessel 110 has a capacity of approximately 38 liters (approximately 10 U.S. gallons). In some embodiments, vessel 110 has a capacity of any other suitable value.

In some embodiments, container 120 is a stainless-steel bucket (in other embodiments, container 120 has any other suitable shape and is made of any other suitable material) configured to fit inside of vessel 110. In some embodiments, container 120 has a false bottom 123 that includes a plurality of holes used to filter wort through without allowing residual grain to pass through. In some embodiments, false bottom 123 of container 120 is a stainless-steel sieve that is welded to the bottom of container 120. In some embodiments, a plurality of removable, stackable sieves 125 (one of which is labeled in FIG. 1A) are stacked successively from false bottom 123 of container 120 such that at least approximately 7.6 centimeters (cm) (approximately 3 inches) of grain can be placed in between false bottom 123 and the first stackable sieve 125 and such that at least approximately 7.6 centimeters (cm) (approximately 3 inches) of grain can be placed in between each successive pair of stackable sieves 125. In some embodiments, the distance separating false bottom 123 of container 120 and the first stackable sieve 125 and the distance separating each successive pair of stackable sieves 125 is any other suitable value. Like false bottom 123 of container 120, each stackable sieve 125 includes a plurality of holes used to filter wort through without allowing residual grain to pass through. Each sieve 125 provides an individual filter that, when combined together in a stack of sieves, separates and clarifies the wort more efficiently for a given volume of grain than conventional systems that rely on filters located at the bottom of the entire volume of grain.

In some embodiments, container 120 includes a lid (with a hole for sparging device 121) that is placed over the top of container 120 during brewing to prevent heat from escaping container 120 during operation of system 100 and thus assist in keeping grain bed 99 at a uniform temperature (in some such embodiments, vessel 110 also includes a lid having a hole for sparging device 121). In some embodiments, container 120 includes a handle for lifting container 120 in and out of vessel 110. In some embodiments, container 120 is placed into vessel 110 such that the bottom of container 120 contacts the bottom of vessel 110. In other embodiments, container 120 is placed into vessel 110 and held in place such that the bottom of container 120 does not contact the bottom of vessel 110. In some such embodiments, container 120 is held in place within vessel 110 by placing a rod or bar having a length longer than the diameter of vessel 110 through the handle on container 120 and resting it across the top of vessel 110. In other such embodiments, a lift mechanism that includes a linear actuator is used to lift container 120 in and out of vessel 110 and to hold container 120 in place within vessel 110 during operation of system 100.

In some embodiments, the wort removed from grain bed 99 passes through false bottom 123 of container 120 and into vessel 110 where it eventually drains out of vessel 110. In some embodiments, the wort removed from vessel 110 is recirculated back up to sparging device 121 by pump 140. In some embodiments, pump 140 is a 1½×1 sanitary centrifugal pump with a single-phase, 3,600 revolutions-per-minute (rpm) motor. In some embodiments, pump 140 is a sanitary centrifugal pump such as provided by Waukesha (e.g., a Waukesha C-100 centrifugal pump; http://www.expertprocesssystems.com/c-series.htm). In some embodiments, pump 140 includes a Variable Frequency Drive (VFD) (e.g., a ¾ horsepower (hp) Mitsubishi FR-E720-0.75 VFD) and a three (3)-phase, 1,800 rpm motor. In some such embodiments, the VFD controls the 1,800 rpm motor such that pump 140 produces variable flow rates for mashing/lautering, boiling, cooling, and clean-in-place (CIP) functions. For example, in some such embodiments, the VFD is run at 60 Hertz (Hz) for mashing/lautering (equivalent to approximately 1,800 rpm), 60 Hz during the boil-off of excess water, 10 Hz during cooling of the wort, and 120 Hz for CIP (equivalent to approximately 3,600 rpm). In some embodiments, pump 140 is any other suitable pump. In some embodiments, the VFD is run at approximately 20 Hz for mashing/lautering.

In some embodiments, system 100 includes one or more hop baskets 150 configured to provide a device for adding hops to the wort during the boil of the wort. In some embodiments, the HopRocket™ provided by Blichmann Engineering is used for the hop baskets 150 (see, e.g., www.blichmannengineering.com/HopRocket/HopRocket.html). In some embodiments, the hop baskets 150 are modified stainless-steel steam strainers such as the Y-Strainer provided by Lenntech (www.lenntech.com/systems/sediment/y/y-strainer.htm).

In some embodiments, system 100 includes one or more valves 160 for changing the direction of flow of (and/or adjusting the flow rate of) wort/water that moves through system 100. For example, in some embodiments, system 100 includes a three-way valve 161 that either directs recirculated wort/water back toward sparging device 121 or directs the recirculated wort/water toward the one or more hop baskets 150. In some embodiments, system 100 further includes a valve 162 that is used to bypass both the sparging device 121 and the hop baskets 150 such that the wort/water is transferred from the drain at the bottom of vessel 110 through the liquid-transfer piping and valves 161 and 162 and then back into the vessel 110 via piping segment 137. In some embodiments, system 100 is designed such that the wort produced is more dilute than desired (i.e., in some embodiments, more water is added to vessel 110 than necessary at the beginning of wort production) and thus excess water needs to be boiled off after the wort is done with the hops-addition stage. In some such embodiments, valve 162 is used to bypass sparging device 121 and hop baskets 150 during the boil-off stage. Additionally, in some such embodiments, the flow rate of wort through system 100 is kept at a high enough flow rate such that the wort stays well-mixed in vessel 110 and such that the heating element in vessel 110 does not scorch the wort.

In some embodiments, system 100 further includes a valve 163 that is configured to control the flow through the one or more hop baskets 150. For example, in some embodiments, if valve 162 is controlled such that wort/water flows toward the hop baskets 150, but valve 163 is closed, then all of the wort/water will flow through the hop basket 150 that is on the left-hand side of FIG. 1B. In some embodiments, valves 160 are manually operated sanitary ball valves (e.g., in some embodiments, valves 161 and 162 are VNE, stainless, EG93CCC-61.0 three-way ball valves (www.vnestainless.com/Valves/BallValves/3WayBallValves/tabid/632/Default.aspx), and, in some embodiments, valve 163 is a tri-clamp sanitary ball valve such as a Tri-Clamp® EW-30530 two-way ball valve (www.coleparmer.com/Search/In%20line%20 valves/Page=1_RecordsPerPage=50_AppliedFilters=4294884283)). In some embodiments, valves 160 are automatically controlled (e.g., in some embodiments, valves 160 are fully automated ball valves such as provided by A-T Controls, Inc., www.a-tcontrols.com/products/ball_valves/automated_ball_valves/automated_ball_valve_38.html). In some embodiments, valves 160 are any other suitable type of valve.

In some embodiments, the wort moving within system 100 is carried by liquid-transfer piping (e.g., piping segment 131 exiting vessel 110, piping segment 132 exiting pump 140, piping segment 133 between valve 161 and sparging device 121, piping segment 134 between valve 161 and valve 162, piping segment 135 between valve 162 and hop baskets 150/valve 163, piping segment 136 leaving hop basket 150, piping segment 137 transferring wort/water to the bottom of vessel 110, and piping segment 138 between valve 162 and piping 137). In FIG. 1A, piping segment 132 is shown as stopping at a broken line located above pump 140 in order to fully expose pump 140 to view, but in reality, segment 132 continues past the broken line such that it connects directly to pump 140. In some embodiments, the liquid-transfer piping is made from stainless steel. In some embodiments, the liquid-transfer piping is made from polyvinyl chloride (PVC). In some embodiments, the liquid-transfer piping is made from any other suitable material.

In some embodiments, system 100 is a fully automated system that is controlled by controller 170. In some embodiments, controller 170 senses various parameters of system 100 and automatically controls (using look-up tables (e.g., one or more computer look-up tables containing values for control parameters that are looked up based on the sensed signals and then used to control one or more processes) or feedback circuits or the like) a plurality of parameters of system 100 (e.g., temperature of the liquid in vessel 110, flow rates of the wort/water at various locations in system 100, and other similar parameters) such that the optimal conditions for wort preparation exist. In some embodiments, controller 170 receives data regarding system 100 from a plurality of sensors 180, processes the data, and outputs the control signals necessary for optimum wort preparation to a variety of control devices located in system 100. In some embodiments, the plurality of control devices includes heater 111, pump 140, HX 145, hop baskets 150, sparging device 121, and valves 160 (e.g., valves 161, 162, and 163). In some embodiments, the plurality of sensors 180 includes individual sensors 181-187. For example, in some embodiments, controller 170 receives data from sensor 183 (located just downstream of vessel 110) and sensor 182 (in some embodiments, a thermocouple that reads the temperature of the liquid inside vessel 110) regarding wort/water flow rate and temperature, and if, after processing the data, controller 170 determines that more heat and flow rate are required, controller 170 sends out signals to pump 140, valve 161, and/or the heat source for vessel 110 to meet the necessary flow rates and temperatures.

In some embodiments, controller 170 includes a Nema 4X electrical panel having fuse blocks, a 230 volt circuit breaker, a 230/24 volt power supply, and space for expansion. In some embodiments, controller 170 includes a temperature controller that is configured to run on 230-volt single phase power. In some embodiments, sensor 182 includes a temperature probe and thermowell that are installed in vessel 110 and are configured to sense the temperature of the wort/water contained in vessel 110. In some embodiments, controller 170 includes a solid-state heater control that receives a signal from a thermocouple in vessel 110 and uses the signal to turn on and off heater 111 (e.g., in some embodiments, controller 170 includes a Watlow, Series 980/985 temperature controller; www.watlow.com/products/controllers/index.cfm). In some such embodiments, controller 170 further includes a proportional controller that allows the voltage provided to heater 111 to be adjusted (e.g., in some embodiments, controller 170 includes a CST Crydom 240 V RPC2425 proportional controller with a HS-2 heat sink and a 240 V, 1K potentiometer; www.alliedelec.com/search/productdetail.aspx? sku=70131427). In some embodiments, sensors 181, 183, 184, 185, 186, and 187 include flow meters such as Micro-Motion® F-Series Coriolis Flow and Density Meters (www2.emersonprocess.com/en-US/brands/micromotion/coriolis-flow-density-meters/F-Series-Meters/Pages/index-.aspx). In some embodiments, sensor 185 further includes a temperature probe and thermowell that are installed in the hop baskets 150. In some embodiments, controller 170 includes a Programmable Logic Controller (PLC).

In some embodiments, system 100 includes a frame 190 upon which vessel 110, pump 140, valves 160, hop baskets 150, the liquid-transfer piping, and controller 170 are mounted. In some such embodiments, frame 190 is made of wood. In other such embodiments, frame 190 is made from a material that includes metal. In still other such embodiments, frame 190 is made from any other suitable material. In some embodiments, frame 190 includes a plurality of casters 191 such that system 100 is portable.

In some embodiments, system 100 includes clean-in-place (CIP) functions such that water and/or food-grade sanitizer (e.g., Star San sanitizer available at home-brew supply stores such as Northern Brewer in St. Paul, Minn.; www.northernbrewer.com/shop/brewing/star-san.html) is flushed through system 100 to clean and sanitize system 100. For example, in some embodiments, when operating system 100 in CIP mode, water and/or sanitizer is added to vessel 110 and then circulated through system 100 by pump 140, sparging device 121, valves 160, and the liquid-transfer piping.

In some embodiments, instead of being used for all-grain brewing, system 100 is used for extract brewing. In some such embodiments, container 120 is either removed completely (e.g., for batches that only require malt extracts) or container 120 is used to hold specialty grains that are added to the wort at the beginning of wort preparation (in some embodiments, heated water is recirculated through the specialty grains in container 120 via pump 140 and sparging device 121 until the desired specific gravity or color of the wort is achieved, and then the container 120 is removed for the rest of the wort additions (e.g., malt extract and hops)). In some embodiments, when system 100 is used for extract brewing, the desired amount of water is added to vessel 110, heated to boiling, cooled below boiling such that the desired amounts and types of malt extract can be added directly to vessel 110, reheated to boiling for hops additions via hop baskets 150, and then cooled to a temperature suitable for adding the yeast used to ferment the wort into beer.

Figure 1B:
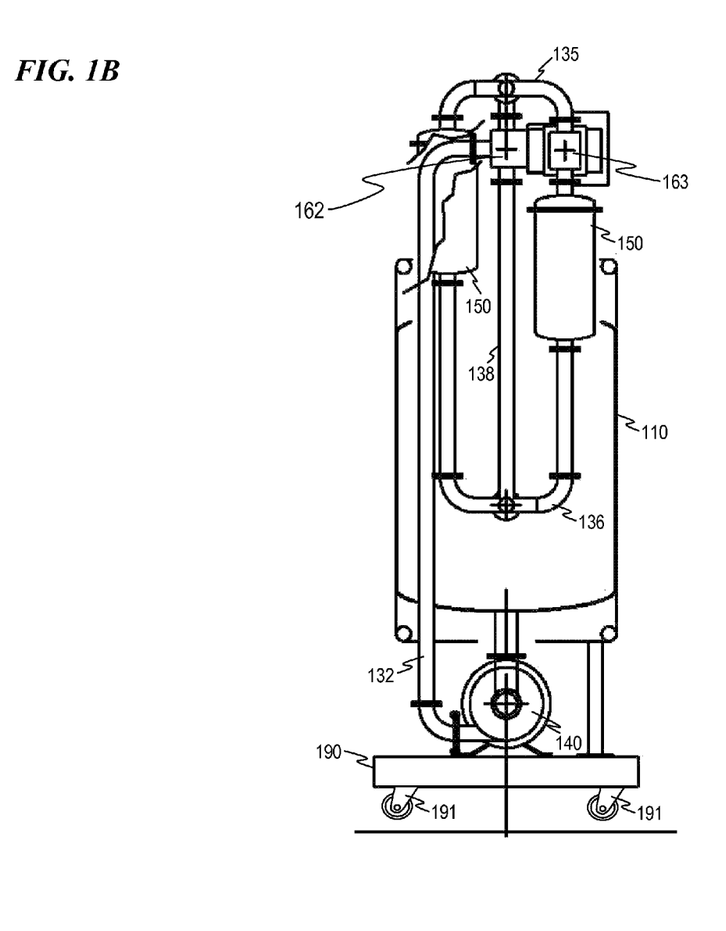
FIG. 1B a side-view schematic diagram of wort-preparation system 100.

FIG. 1B is a side-view schematic diagram of wort-preparation system 100. Piping segment 132, which exits pump 140 and follows a path upward toward valve 161, is fully visible in FIG. 1B, but in reality, the upper portion of piping segment 132 would be blocked by the left-most hop basket 150 when viewing FIG. 1B.

Figure 2A:
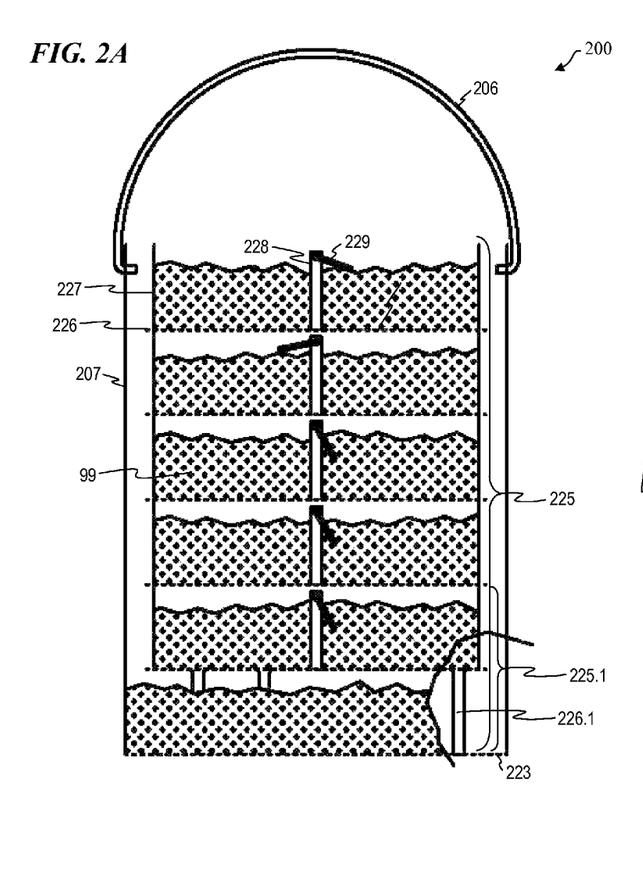
FIG. 2A is a cross-section schematic diagram of a grain container 200.

FIG. 2A is a schematic cross-section diagram of a grain container 200. In some embodiments, grain container 200 is used for container 120 of system 100. In some embodiments, container 200 has a wall 207 and a false bottom 223 that includes a plurality of holes used to filter wort through without allowing residual grain to pass through. In some embodiments, false bottom 223 of container 200 is a stainless-steel sieve that is welded to the bottom of container 200. In some embodiments, a plurality of removable, stackable sieves 225 is stacked successively from false bottom 223 of container 200.

In some embodiments, a first sieve 225.1 (i.e., the sieve 225 that is placed closest to false bottom 223) includes one or more legs 226.1 (e.g., as shown in FIG. 2A, three legs) that support the first sieve 225.1. In some embodiments, the one or more legs 226.1 are welded to the bottom of the first sieve 225.1. In some embodiments, each of the plurality of sieves 225 (including sieve 225.1) includes a lifting rod 228 having an eyelet 229 for moving the sieve in and out of container 200. In some embodiments, other than having the legs 226.1, first sieve 225.1 has the same structure as the other sieves 225.

In some embodiments, each of the plurality of sieves 225 (including first sieve 225.1) further includes a sieve surface 226 and a ring 227. In some embodiments, the sieve surface 226 is a false bottom or screen such as provided by Midwest Brewing, www.midwestsupplies.com/all-grain-brewing/all-grain-equipment/false-bottoms-screens.html. In some embodiments, the plurality of holes on sieve surface 226 are spaced apart by any other suitable distance that can hold back residual grains while allowing wort to pass through the holes. In some embodiments, ring 227 provides an outer boundary for the grain 99 placed on each sieve 225 and provides a surface for the next sieve 225 to be set down onto. In some embodiments, the height of each ring 227 is used to set the distance between each successive sieve 225 in the sieve stack. In some embodiments, the sieve surfaces 226 and rings 227 are stainless steel. In some embodiments, sieve surfaces 226 and rings 227 include any other suitable material. In some embodiments, ring 227 is welded to sieve surface 226. In other embodiments, ring 227 is simply placed on top of its respective sieve surface 226 to form the complete sieve 225. In some embodiments, each sieve 225 provides an individual filter that, when combined together in a stack of sieves, separates and clarifies the wort more efficiently for a given volume of grain than conventional systems that rely on filters located at the bottom of the entire volume of grain. In some embodiments, the grain 99 that builds up on each sieve 225 also forms a filter cake that provides additional filtration media.

In some embodiments, the plurality of sieves 225 are separated from each other such that there is enough room between each sieve 225 for a layer of grain that is at least approximately 7.6 centimeters (cm) (approximately 3 inches) deep. In some embodiments, the plurality of sieves 225 are separated from each other such that there is enough room between each sieve 225 for a layer of grain that is at least approximately 8.9 centimeters (cm) (approximately 3.5 inches) deep. In some embodiments, the plurality of sieves 225 are separated from each other such that there is enough room between each sieve 225 for a layer of grain that is at least approximately 10 centimeters (cm) (approximately 4 inches) deep. In some embodiments, the plurality of sieves 225 are separated from each other such that there is enough room between each sieve 225 for a layer of grain that is at least approximately 11 centimeters (cm) (approximately 4.5 inches) deep. In some embodiments, the plurality of sieves 225 are separated from each other such that there is enough room between each sieve 225 for a layer of grain that is at least approximately 13 centimeters (cm) (approximately 5 inches) deep. In some embodiments, the plurality of sieves 225 are separated from each other such that there is enough room between each sieve 225 for a layer of grain that is greater than approximately 13 centimeters (cm) (approximately 5 inches) deep. In some embodiments, the plurality of sieves 225 are separated from each other such that there is enough room between each sieve 225 for a layer of grain that is less than approximately 7.6 centimeters (cm) (approximately 3 inches) deep.

In some embodiments, container 200 includes a handle 206 for lifting container 200 in and out of vessel 110. In some embodiments, container 200 is placed into vessel 110 such that the bottom of container 200 contacts the bottom of vessel 110. In other embodiments, container 200 is placed into vessel 110 and held in place such that the bottom of container 200 does not contact the bottom of vessel 110. In some such embodiments, container 200 is held in place within vessel 110 by placing a rod or bar having a length longer than the diameter of vessel 110 through handle 206 on container 200 and resting it across the top of vessel 110. In other such embodiments, a lift mechanism (e.g., a hoist) is used to lift container 200 by handle 206 and to hold container 200 in place within vessel 110.

In some embodiments, instead of the first sieve 225.1 being held in place by feet that contact false bottom 223 and instead of successive sieves 225 being placed on top of the rings 227 of each adjacent sieve 225, the inner portion of wall 207 of container 200 includes notches that are configured to hold each sieve surface 226 in place. In some such embodiments, each sieve 225 consists of a sieve surface 226 having a lifting rod 228 and an eyelet 229 (i.e., no rings 227 are required in such embodiments).

Figure 2B:
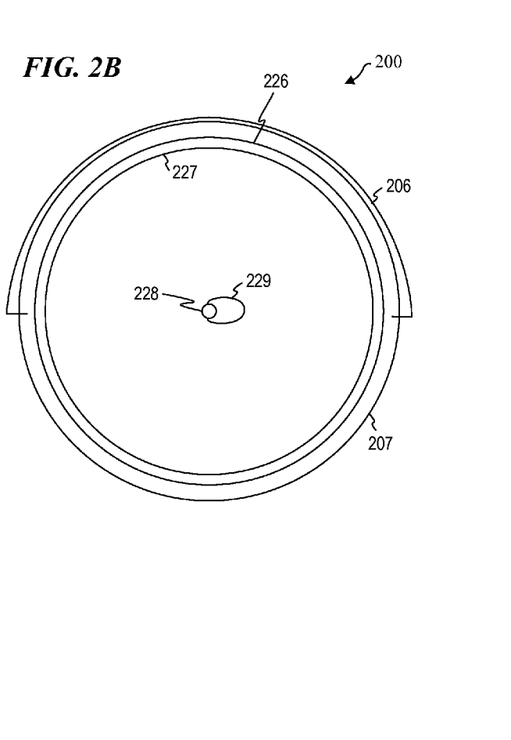
FIG. 2B is a plan view of grain container 200.

FIG. 2B is a plan view of grain container 200. In some embodiments (as shown in FIG. 2B), the diameter of sieve surface 226 is larger than the diameter of ring 227. In some embodiments, the diameter of sieve surface 226 is substantially similar to the diameter of ring 227. In some embodiments, the diameter of wall 207 is larger than the outer diameter of each of the plurality of sieves 225.

Figure 3A:
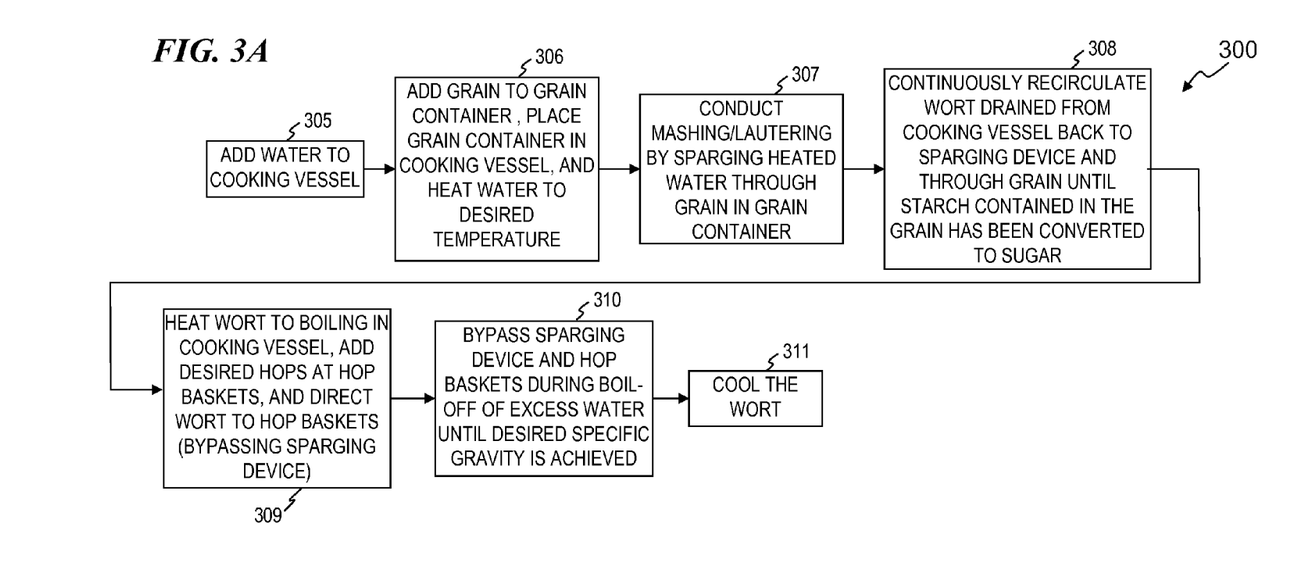
FIG. 3A is a block diagram illustrating a method of preparing wort according to one embodiment of the present invention.

FIG. 3A is a block diagram 300 illustrating a method of preparing wort according to one embodiment of the present invention. In some embodiments, the method depicted in diagram 300 is used with system 100 of FIG. 1A and FIG. 1B and/or container 200 of FIG. 2A and FIG. 2B. In some embodiments, water is added to the cooking vessel (e.g., vessel 110) at block 305. In some embodiments, more water than necessary for the desired final concentration of wort is added at block 305, and the excess water is boiled off at block 310. For example, in some embodiments, in order to make a 19 liter (approximately 5 U.S. gallons) batch of wort, approximately 30 liters of water (approximately 8 U.S. gallons) are added to vessel 110. In some embodiments, in order to make a 38 liter (approximately 10 U.S. gallons) batch of wort, approximately 49 liters of water (approximately 13 U.S. gallons) are added to the vessel 110.

In some embodiments, at block 306, grain (e.g., milled, malted grain such as barley, oats, wheat, or the like) is loaded into container 120 along with the plurality of stackable sieves 125, container 120 is placed inside vessel 110, and the water added to vessel 110 is heated to the desired temperature by a heating device operatively coupled to vessel 110. In some embodiments, grain container 120 is placed in vessel 110 such that it is completely submersed in the water contained in vessel 110. In other embodiments, grain container 120 is placed such that it is only partially submersed in the water contained in vessel 110. In still other embodiments, grain container 120 is placed such that it is not submersed in the water contained in vessel 110 at all. In contrast to conventional systems where the grain must be fully submersed in the water during the mashing stage of wort preparation in order to uniformly bring the grain up to the desired mash temperature(s), the present invention does not require full submersion because, in some embodiments, system 100 uniformly cooks the grain by sparging the heated water down through the grain and then continuously recirculating the water/wort through the grain such that the water/wort passes through the grain in a laminar-flow manner. The ability to minimize or avoid submersing container 120 in the water of vessel 110 allows for larger batches of wort to be produced in a given vessel 110 since any submersion of container 120 displaces water up toward the top of vessel 110 and thus limits the amount of water that can be added to vessel 110 prior to placing container 120 within vessel 110. For example, in some embodiments, where vessel 110 has a capacity of approximately 61 liters (approximately 16 U.S. gallons), an approximately 19 liter (approximately 5 U.S. gallon) batch of wort can be made when container 120 is fully submersed in the water of vessel 110, and an approximately 38 liter (approximately 10 U.S. gallons) batch of wort can be produced when container 120 is only partially submersed in the water of vessel 110. Partial or no submersion of container 120, therefore, allows for larger batches to be made in a given vessel and/or allows for smaller vessels to be used for a given target batch size.

In some embodiments, at block 307, a combined mashing/lautering process is conducted by sparging the heated water through the grain in container 120. In some embodiments, the mashing of the grain to break down the grain's starches into fermentable sugars is achieved due to the heated water flowing through the grain, and the lautering occurs substantially simultaneously with the mashing because the fermentable sugars leave the grains with the water that is flowing through the grains and through the plurality of sieves (e.g., sieves 125 of FIG. 1A or sieves 225 of FIG. 2A). In some embodiments, the mashing/lautering process includes holding the water/wort at certain temperatures for certain periods of time in order to achieve optimum conditions for cooking the grain. For example, in some embodiments, the mashing/lautering process includes pauses (i.e., holding the temperature steady) at temperatures of 45 degrees Celsius (C), 62 degrees C., and 73 degrees C. In some embodiments, the mashing/lautering process includes pauses at temperatures of approximately 66 degrees Celsius (approximately 150 degrees Fahrenheit) and approximately 77 degrees Celsius (approximately 170 degrees Fahrenheit). Conventional systems often achieve temperature pauses during mashing by performing what is referred to as a decoction. In a decoction, part of the mash (i.e., the combination of wort and residual grain) is removed, the removed mash is boiled in a separate vessel, and then the removed/boiled mash is recombined with the remainder of the mash and used as infusion water to heat the remainder of the mash. For example, in a triple decoction, there are three main temperature pauses for the mash and thus three separate decoctions. In some embodiments, the combined mashing/lautering process and automatically controlled heater 111 in cooking vessel 110 provide the ability to control temperature pauses without performing decoctions, and thus, in some such embodiments, the present invention significantly reduces the time and labor required for mashing as compared to conventional mashing systems.

In some embodiments, at block 308, the wort produced from the heated water passing completely through container 120 exits vessel 110 and is then continuously recirculated back to the sparging device (e.g., sparging device 121) and down through the grain until at least a portion of the starch contained in the grain (e.g., in some embodiments, all or substantially all of the starch) has been converted to sugar. In some embodiments, in order to determine whether the starch contained in the grain has been converted to sugar, a starch conversion test is performed (e.g., in some embodiments, an iodine test is performed where a sample of the wort is removed and a few drops of iodine are added to the wort—if starch conversion is incomplete, the iodine will turn black, and if starch conversion is complete, the iodine will remain a reddish brown color). In some such embodiments, the clarity of the wort is also observed as part of determining the extent of recirculation. In some embodiments, after recirculation is complete, an amount of fresh water is sparged through grain bed 99 to rinse out any wort still remaining in grain bed 99.

In some embodiments, at block 309, the wort is heated to boiling in vessel 110, hops are added to the hop baskets 150, and the wort from vessel 110 is directed toward hop baskets 150 (bypassing sparging device 121) such that the hops in hop baskets 150 are added to the wort flowing through hop baskets 150. In some embodiments, hops additions are made at various times throughout the boil of the wort (e.g., in some embodiments, the wort is boiled for 60 minutes and a first type of hops is added via a first hop basket 150 at the beginning of the boil, while a second type of hops is added via a second hop basket 150 at the end of the boil). In some embodiments, in one or more of the hop baskets 150, whole or pelleted hops are placed on a screen that holds back the hops and allows wort to pass through such that the hops flavor the wort as it circulates through the hop baskets 150. In some embodiments, container 120, which at this point contains residual grains from the mashing/lautering, is also removed from vessel 110 at block 309.

In some embodiments, at block 310, valves 161 and 162 are operated such that the wort bypasses both sparging device 121 and hop baskets 150. In some such embodiments, any amount of excess water still in the wort is boiled off until a desired specific gravity is achieved. The target specific gravity is generally dependent on the type of beer to be produced by the wort. For example, in some embodiments, if the wort being produced is for generating an American Lager, the desired specific gravity has an approximate range of 1.040 to 1.050, and, in some embodiments, if the wort being produced is for generating a Russian Imperial Stout, the desired specific gravity has an approximate range of 1.075 to 1.115. In some embodiments, system 100 includes a mass-flow meter as one of the sensors 180 that is configured to sense the specific gravity of the wort flowing through system 100 (e.g., in some embodiments, a Micro-Motion® F-Series Coriolis Flow and Density Meter; www2.emersonprocess.com/en-US/brands/micromotion/coriolis-flow-density-meters/F-Series-Meters/Pages/index-.aspx). In some such embodiments, controller 170 receives signals from the mass-flow meter and sends out control signals to heater 111, pump 140, and valves 160 based on the received mass-flow reading.

In some embodiments, at block 311, the wort is cooled from boiling to a temperature conducive for fermentation in the wort (e.g., in some embodiments, 20 degrees C.). In some embodiments, the wort is cooled by pumping the wort across a plate heat exchanger (e.g., a plate heat exchanger provided by Alfa Laval; www.alfalaval.com/products-and-solutions/plate-heat-exchangers/Pages/Plate-heat-exchangers.aspx). In some such embodiments, the wort is pumped at a rate that is low enough to avoid excessive froth formation in the wort caused by the entrainment of too much air in the wort (e.g., in some embodiments, during cooling, a VFD used to control a 3-phase, 1,800 rpm motor that powers the wort-circulation pump (e.g., pump 140) is operated at approximately 10-20 Hertz (Hz)). In some embodiments, the wort is cooled by placing a stainless-steel coil into the wort contained in vessel 110 and pumping cold water through the coil (e.g., in some embodiments, a wort chiller such as provided by Northern Brewer, www.northernbrewer.com/shop/brewing/brewing-equipment/wort-chillers). In some such embodiments, the cooling coil is configured to rotate such that the wort is mixed during cooling.

Figure 3B:
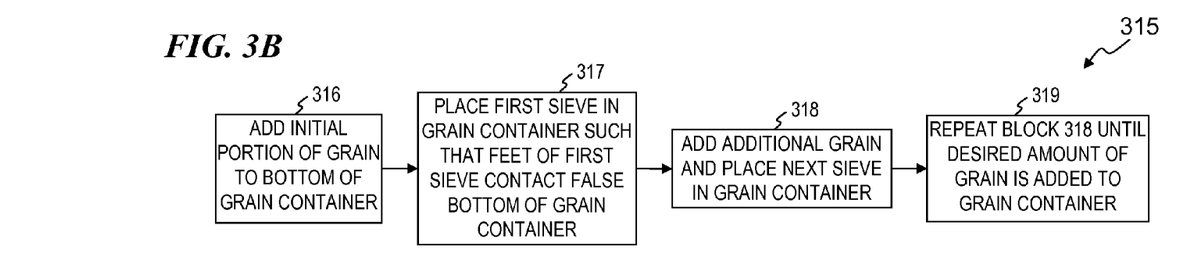
FIG. 3B is a block diagram illustrating a method of loading grain into a grain container according to one embodiment of the present invention.

FIG. 3B is a block diagram 315 illustrating a method of loading grain into a grain container according to one embodiment of the present invention. In some embodiments, the method depicted in diagram 315 is used with system 100 of FIG. 1A and FIG. 1B and/or container 200 of FIG. 2A and FIG. 2B. In some embodiments, at block 316, a first portion of grain is placed into container 200 such that it rests on false bottom 223 of container 200. In some embodiments, at block 317, the first sieve 125 is placed into container 200 such that the feet of the first sieve 225.1 contact false bottom 223 of container 200 (see, e.g., FIG. 2A). In some embodiments, at block 318, additional grain is added to the top of the first sieve 225.1 (e.g., in some embodiments, approximately 7.6 centimeters (cm) (approximately 3 inches) of grain) and then the second sieve 225 is placed on top of the first sieve 225.1. In some such embodiments, as shown in FIG. 2A, only the first sieve 225.1 has legs 226.1 and thus each remaining sieve 225 is stacked on top of the ring 227 of the immediately preceding sieve 225. In some embodiments, the plurality of sieves 225 are separated from each other such that there is enough room between each sieve 225 for a layer of grain that is at least approximately 7.6 centimeters (cm) (approximately 3 inches) deep. In some embodiments, at block 319, the process of block 318 is repeated until the desired amount of grain is added to grain container 200. For example, in some embodiments, as illustrated in FIG. 2A, grain is added to container 200 along with five sieves 225 (including first sieve 225.1) such that there are six separate grain layers, each having a depth of approximately 7.6 cm (approximately 3 inches).

In some embodiments, the present invention provides: a one-kettle, stainless-steel, complete system for all-grain or extract brewing, a compact design, a re-circulating mash/lauter system that minimizes or eliminates grain-bed clumping, very efficient lautering, very precise temperature control, built-in CIP, hop baskets for automated hops additions, boiling to sugar-level set points (e.g., boiling until all starch is converted), automated wort cooling, repeatable wort production. In some embodiments, the present invention provides a brewing system that is ideal for producing both large volumes and for developing new recipes (e.g., pilot-scale production). In some embodiments, the brewing system of the present invention is a modular design that can be easily expanded.

Figure 4:
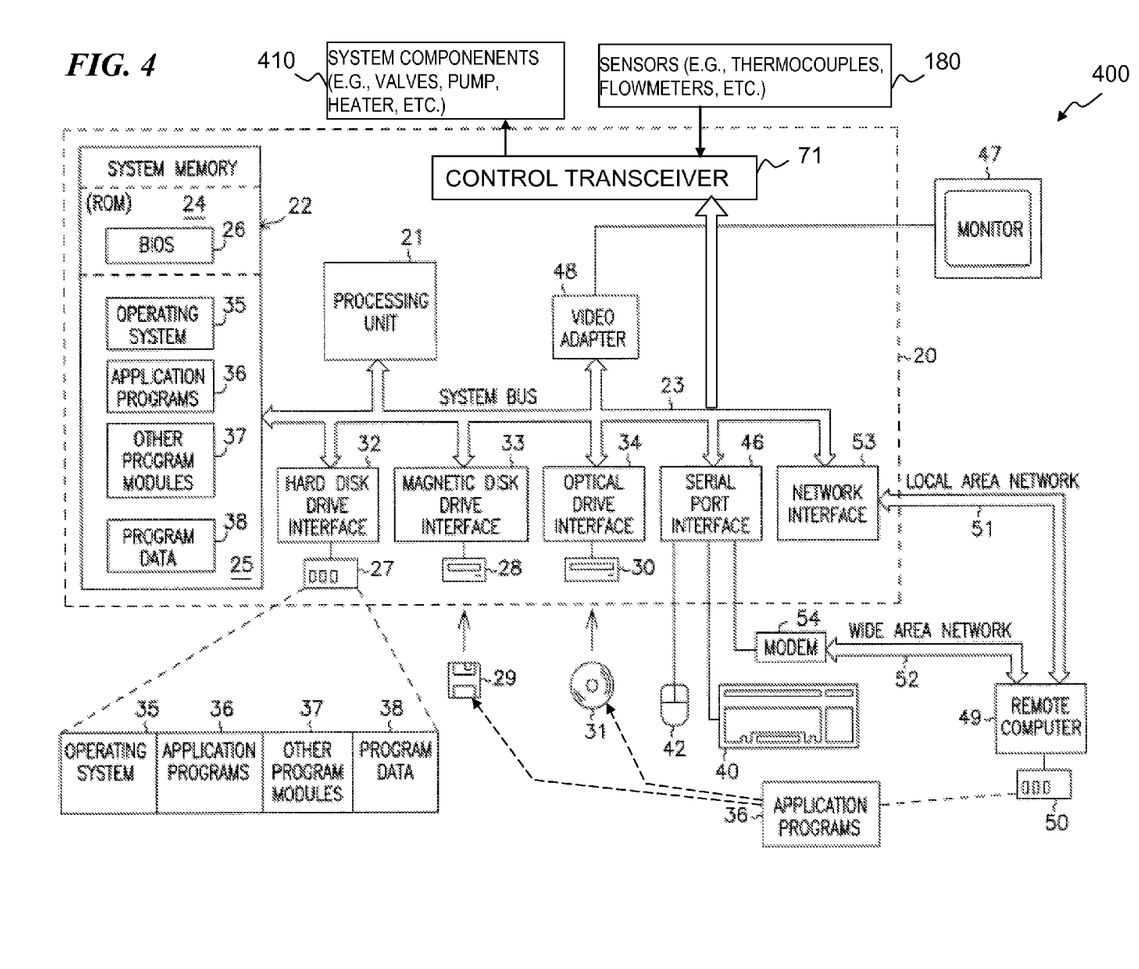
FIG. 4 is an overview diagram of a hardware- and operating-environment (or system) 400 that is used to control system 100 in some embodiments of the present invention.

FIG. 4 is an overview diagram of a hardware- and operating-environment (or system) 400 that is used to control system 100 in some embodiments of the present invention. In some embodiments, controller 170 of FIG. 1A includes system 400. The description of FIG. 4 is intended to provide a brief, general description of suitable computer hardware and a suitable computing environment in conjunction with which the invention may be implemented. In some embodiments, the invention is described in the general context of computer-executable instructions, such as program modules, that are stored on computer-readable media and that are executed by a computer, such as a microprocessor residing in a personal computer that is linked to the system components 410 (e.g., valve 161) and sensors 180 of system 100. Generally, program modules include routines, programs, objects, components, data structures, and the like, that perform particular tasks or implement particular abstract data types.

In some embodiments, system 400 includes a user-control console computer 20 that is programmable and that has a control transceiver 71 that allows control of system components 410. In some embodiments, transceiver 71 is configured to communicate wirelessly with system components 410 and/or sensors 180. In some embodiments, application programs 36 stored on a computer-readable storage device (e.g., optical disk 31 (CDROM, DVD, Blu-ray Disc™ (BD), or the like), magnetic or FLASH storage device 29 (e.g., floppy disk, thumb drive, SDHC™ (Secure-Data High-Capacity) memory card or the like), and/or a storage device 50 connected to a remote computer 49 that connects to computer 20 across a local-area network 51 or a wide-area network 52 such as the internet) contain instructions and/or control structures (such as look-up tables, control parameters, databases and the like) that are processed and/or transmitted to system components 410 to control their operation by methods of the present invention described herein. In some embodiments, the applications programs 36 are partially executed in the computer 20, and then partially executed in the system components 410.

As shown in FIG. 4, in some embodiments, the hardware- and operating-environment includes user-control console computer 20, or a server 20, including a processing unit 21, a system memory 22, and a system bus 23 that operatively couples various system components including the system memory 22 to the processing unit 21. In some embodiments, there may be only one, or in other embodiments, there may be more than one processing unit 21, such that the processor of computer 20 comprises a single central-processing unit (CPU), or a plurality of processing units, commonly referred to as a multi-processor or parallel-processing environment. In various embodiments, computer 20 may be implemented using a conventional computer, a distributed computer, or any other type of computer including those embedded in cell phones, personal-data-assistant devices or other form factors. For example, in some embodiments, computer 20 is implemented as any suitable computing device such as a desktop computer or a network of such computers, a laptop computer (e.g., a Macbook®), a tablet computer (e.g., an iPad®), a music and/or video-player computer (e.g., an iPod Touch®), a cell phone computer (e.g., an iPhone®), a smart television (one that can stream video programming from the internet), a video-streaming device (e.g., a Roku® or an AppleTV®) that obtains content from the internet and outputs the content to a conventional high-definition TV, a computer/MP3-player/CD-player/GPS/phone system in an automobile or other vehicle, or any other suitable personal-computing (PC) platform (although several Apple® products are listed as typical examples here since most persons of skill in the art can identify the type of device by analogy to such Apple® products, the products of any other manufacturer may be substituted).

The system bus 23 can be any of several types of bus structures including a memory bus or memory controller, a peripheral bus, and a local bus using any of a variety of bus architectures. The system memory can also be referred to as simply the memory, and includes read-only memory (ROM) 24 and random-access memory (RAM) 25. A basic input/output system (BIOS) 26, containing the basic routines that help to transfer information between elements within the computer (or server) 20, such as during start-up, may be stored in ROM 24. The computer 20 further includes a hard disk drive 27 for reading from and writing to a magnetic hard disk, a removable-media drive or FLASH controller 28 for reading from or writing to a removable magnetic floppy-disk or FLASH storage device 29, and an optical disk drive 30 for reading from or writing to a removable optical disk 31 (such as a CDROM, DVD, Blu-ray Disc™ (BD) or other optical media).

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non-volatile, non-ephemeral storage of computer-readable instructions, data structures, program modules and other data for the computer 20. It should be appreciated by those skilled in the art that any type of computer-readable media which can store data that is accessible by a computer, such as magnetic cassettes, FLASH memory cards, digital video disks, Bernoulli cartridges, random-access memories (RAMs), read-only memories (ROMs), redundant arrays of independent disks (e.g., RAID storage devices) and the like, can be used in the exemplary operating environment.

A plurality of program modules that implement the optimization methods of the present invention can be stored on the hard disk, magnetic or FLASH storage device 29, optical disk 31, ROM 24, or RAM 25, including an operating system 35, one or more application programs 36, other program modules 37, and program data 38. A plug-in program containing a security transmission engine for the present invention can be resident on any one, or on a plurality of these computer-readable media.

In some embodiments, a user (e.g., the brewer) enters commands into the computer 20 through input devices such as a keyboard 40, pointing device 42 or other suitable devices. These input devices are often connected to the processing unit 21 through a serial port interface 46 that is coupled to the system bus 23, but can be connected by other interfaces, such as a parallel port, game port, or a universal serial bus (USB); a monitor 47 or other type of display device can also be connected to the system bus 23 via an interface, such as a video adapter 48. The monitor 47 can display a graphical user interface for the audiologist and/or user. In addition to the monitor 47, computers typically include other peripheral output devices (not shown), such as speakers and printers.

In some embodiments, computer 20 operates in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above relative to the computer 20, although only memory storage device 50 and application programs 36 have been illustrated in FIG. 4. The logical connections depicted in FIG. 4 include local-area network (LAN) 51 and wide-area network (WAN) 52. Such networking environments are commonplace in office networks, enterprise-wide computer networks, intranets and the Internet, which are all types of networks.

When used in a local-area networking (LAN) environment, the computer 20 is connected to the LAN 51 through a network interface, modem or adapter 53, which is one type of communications device. When used in a wide-area networking (WAN) environment such as the internet, the computer 20 typically includes an adaptor or modem 54 (a type of communications device), or any other type of communications device, e.g., a wireless transceiver, for establishing communications over the wide area network 52, such as the internet. The modem 54, which may be internal or external, is connected to the system bus 23 via the serial port interface 46. In a networked environment, program modules depicted relative to the personal computer 20, or portions thereof, can be stored in the remote memory storage device 50 of remote computer (or server) 49 and accessed over the internet or other communications means. Note that the transitory signals on the internet may move stored program code from a non-transitory storage medium at one location to a computer that executes the code at another location by the signals on one or more networks. The program instructions and data structures obtained from a network or the internet are not "stored" on the network itself, but are stored in non-transitory storage media that may be connected to the internet from time to time for access. It is appreciated that the network connections shown are exemplary, and in some embodiments, other means of, and communications devices for, establishing a communications link between the computers may be used including hybrid fiber-coax connections, T1-T3 lines, DSL's, OC-3 and/or OC-12, TCP/IP, microwave, WAP (wireless application protocol), and all other electronic media through standard switches, routers, outlets and power lines, as the same are known and understood by one of ordinary skill in the art.

The hardware and operating environment in conjunction with which embodiments of the invention may be practiced has been described. The computer 20 in conjunction with which embodiments of the invention can be practiced can be a conventional computer, a distributed computer, or any other type of computer; the invention is not so limited. Such a computer 20 typically includes one or more processing units as its processor, and a computer-readable medium such as a memory. The computer 20 can also include a communications device such as a network adapter or a modem, so that it is able to communicatively couple to other computers, servers, or devices. In some embodiments, one or more parts of system 400 elicits and receives input from a user, and based on the input, modifies, adjusts or executes one or more of the methods of the present invention as described herein.

In some embodiments, the present invention provides a brewing system that includes a cooking vessel configured to heat a fluid in the cooking vessel, wherein the cooking vessel includes a drain; a grain container having a false bottom, wherein the grain container is configured to hold a grain bed, wherein the grain container includes a plurality of sieves that are configured to separate the grain bed into a plurality of grain layers, and wherein the grain container is configured to be placed within the cooking vessel; and a fluid-circulation system configured to circulate fluid in the brewing system, wherein the circulation of the fluid includes a transfer of the fluid heated by the cooking vessel into the grain container such that the transferred fluid contacts a top surface of the grain bed, filters through the grain bed and the plurality of sieves, and enters the cooking vessel via the false bottom of the grain container, and wherein the circulation of the fluid further includes a re-circulation of the fluid that exits the cooking vessel via the drain back to the top surface of the grain bed.

In some embodiments of the brewing system, the fluid has a laminar flow as it filters through the grain bed and the plurality of sieves. In some embodiments, the grain bed is not moved by the fluid that filters through the grain bed and the plurality of sieves.

In some embodiments of the brewing system, the fluid-circulation system includes a sparging device that sparges the fluid onto the top surface of the grain bed. In some embodiments, the fluid-circulation system includes a sparging device that sparges the fluid onto the top surface of the grain bed, wherein the sparging device is a fluid distributor.

In some embodiments of the brewing system, the cooking vessel includes an electrical heating element configured to heat the fluid in the cooking vessel.

In some embodiments of the brewing system, the plurality of sieves includes a first sieve, a second sieve, and a third sieve, and wherein the plurality of sieves is configured to be stacked together in the grain container such that the first sieve is placed in contact with the false bottom of the grain container, the second sieve is stacked on the first sieve, and the third sieve is stacked on the second sieve. In some embodiments, the plurality of sieves includes a first sieve having a plurality of legs, a second sieve, and a third sieve, wherein each one of the plurality of sieves includes a ring that forms a cylindrical wall, and wherein the plurality of sieves is configured to be stacked together in the grain container such that the plurality of legs of the first sieve is placed on the false bottom of the grain container, the second sieve is stacked on the cylindrical wall of the first sieve, and the third sieve is stacked on the cylindrical wall of the second sieve. In some embodiments, the plurality of sieves includes five sieves. In some embodiments, each one of the plurality of grain layers has a depth of approximately 7.6 centimeters (cm).

In some embodiments of the brewing system, the grain container is configured to be lifted into and out of the cooking vessel by an automated lifting mechanism. In some embodiments, the grain container is configured to be placed in the cooking vessel such that at least a portion of the grain container is submersed in the fluid in the cooking vessel. In some embodiments, the grain container is configured to be placed in the cooking vessel such that no portion of the grain container is submersed in the fluid in the cooking vessel.

In some embodiments of the brewing system, the fluid-circulation system includes stainless-steel liquid-transfer piping. In some embodiments, the fluid-circulation system includes a sanitary centrifugal pump. In some embodiments, the fluid-circulation system includes a sanitary centrifugal pump, and wherein the fluid-circulation system includes a variable-frequency drive operatively coupled to the pump and configured to provide variable speed flow rates for the fluid circulated by the fluid-circulation system.

In some embodiments, the brewing system further includes a plurality of sensors configured to sense parameters in the brewing system and generate sense signals based on the sensed parameters; a plurality of brewing control devices; and a controller operatively coupled to the plurality of brewing control devices and operatively coupled to the plurality of sensors, wherein the controller is configured to automatically control the brewing control devices based at least in part on the sense signals.

In some embodiments, the brewing system further includes a plurality of sensors configured to sense parameters in the brewing system and generate sense signals based on the sensed parameters; a plurality of brewing control devices; and a controller operatively coupled to the plurality of brewing control devices and operatively coupled to the plurality of sensors, wherein the controller is configured to automatically control the brewing control devices based at least in part on the sense signals, wherein the plurality of brewing control devices includes one or more sanitary ball valves.

In some embodiments, the brewing system further includes a plurality of sensors configured to sense parameters in the brewing system and generate sense signals based on the sensed parameters; a plurality of brewing control devices; and a controller operatively coupled to the plurality of brewing control devices and operatively coupled to the plurality of sensors, wherein the controller is configured to automatically control the brewing control devices based at least in part on the sense signals, wherein the plurality of brewing control devices includes a heater operatively coupled to the cooking vessel.

In some embodiments, the brewing system further includes a plurality of sensors configured to sense parameters in the brewing system and generate sense signals based on the sensed parameters; a plurality of brewing control devices; and a controller operatively coupled to the plurality of brewing control devices and operatively coupled to the plurality of sensors, wherein the controller is configured to automatically control the brewing control devices based at least in part on the sense signals, wherein the fluid-circulation system includes a sanitary centrifugal pump, wherein the fluid-circulation system includes a variable-frequency drive operatively coupled to the pump and configured to provide variable speed flow rates for the fluid circulated by the fluid-circulation system, and wherein the plurality of brewing control devices includes the pump and the variable-frequency drive.

In some embodiments, the brewing system further includes a cooling device operatively coupled to the fluid-circulation system and configured to cool the fluid circulated by the fluid-circulation system. In some embodiments, the brewing system further includes a cooling device operatively coupled to the fluid-circulation system and configured to cool the fluid circulated by the fluid-circulation system, wherein the cooling device includes a plate heat exchanger. In some embodiments, the brewing system further includes a cooling device operatively coupled to the fluid-circulation system and configured to cool the fluid circulated by the fluid-circulation system, wherein the cooling device includes a wort chiller.

In some embodiments, the brewing system further includes one or more hop baskets operatively coupled to the fluid-circulation system and configured to add hops to the fluid circulated by the fluid-circulation system.

In some embodiments, the brewing system further includes a frame upon which the cooking vessel, the grain container, and the fluid-circulation system are mounted, wherein the frame includes a plurality of casters such that the brewing system is portable.

In some embodiments, the present invention provides a method for preparing wort that includes providing a cooking vessel having a drain; adding a fluid to the cooking vessel; heating the fluid in the cooking vessel; providing a grain container having a false bottom; providing a plurality of sieves; loading a grain bed and the plurality of sieves into the grain container such that the grain bed is separated by the plurality of sieves into a plurality of grain layers; placing the grain container into the cooking vessel; and circulating the fluid, wherein the circulating of the fluid includes: transferring the fluid heated by the cooking vessel into the grain container such that the transferred fluid contacts a top surface of the grain bed, filters through the grain bed and the plurality of sieves, and enters the cooking vessel via the false bottom of the grain container, and re-circulating the fluid that exits the cooking vessel via the drain back to the top surface of the grain bed.

In some embodiments of the method, the fluid has a laminar flow as it filters through the grain bed and the plurality of sieves. In some embodiments, the grain bed is not moved by the fluid that filters through the grain bed and the plurality of sieves. In some embodiments, the transferring of the fluid includes sparging the fluid onto the top surface of the grain bed. In some embodiments, each one of the plurality of grain layers has a depth of approximately 7.6 centimeters (cm).

In some embodiments of the method, the placing of the grain container into the cooking vessel includes submersing at least a portion of the grain container in the fluid in the cooking vessel. In some embodiments, the placing of the grain container into the cooking vessel includes submersing no portion of the grain container in the fluid in the cooking vessel.

In some embodiments of the method, the re-circulating of the fluid is performed until a target specific gravity of the fluid is achieved. In some embodiments, the re-circulating of the fluid is performed until a target clarity of the fluid is achieved. In some embodiments, the re-circulating of the fluid is performed until at least a portion of starch contained in the grain bed is converted into sugar.

In some embodiments of the method, the circulating of the fluid includes cooling the fluid. In some embodiments, the method further includes providing a plate heat exchanger, wherein the circulating of the fluid includes cooling the fluid with the plate heat exchanger.

In some embodiments, the method further includes providing one or more hops baskets, wherein the circulating of the fluid includes adding hops to the circulated fluid via the one or more hop baskets.

In some embodiments of the method, the plurality of sieves includes a first sieve, a second sieve, and a third sieve, wherein the first sieve includes a plurality of legs, wherein each one of the plurality of sieves includes a ring that forms a cylindrical wall, and wherein the loading of the grain bed and the plurality of sieves into the grain container includes: loading a first portion of the grain bed into the grain container such that the first portion of the grain bed rests on the false bottom of the grain container, placing the first sieve into the grain container such that the legs of the first sieve contact the false bottom of the grain container, loading a second portion of the grain bed into the grain container by placing the second portion of the grain bed on top of the first sieve, placing the second sieve into the grain container such that the second sieve rests on the cylindrical wall of the first sieve, loading a third portion of the grain bed into the grain container by placing the third portion of the grain bed on top of the second sieve, placing the third sieve into the grain container such that the third sieve rests on the cylindrical wall of the second sieve, and loading a fourth portion of the grain bed into the grain container by placing the fourth portion of the grain bed on top of the third sieve.

In some embodiments of the method, the heating of the fluid in the cooking vessel includes heating the fluid to a boiling temperature of the fluid. In some embodiments, the circulating of the fluid includes automatically varying a flow rate of the fluid.

In some embodiments, the method further includes sensing a plurality of brewing parameters associated with the preparing of the wort and generating sense signals based on the sensed parameters; and automatically controlling the preparing of the wort based at least in part on the sense signals. In some embodiments, the method further includes sensing a plurality of brewing parameters associated with the preparing of the wort and generating sense signals based on the sensed parameters; and automatically controlling the preparing of the wort based at least in part on the sense signals, wherein the plurality of brewing parameters includes a specific gravity of the fluid, and wherein the automatically controlling includes stopping the heating of the fluid. In some embodiments, the method further includes sensing a plurality of brewing parameters associated with the preparing of the wort and generating sense signals based on the sensed parameters; and automatically controlling the preparing of the wort based at least in part on the sense signals, wherein the plurality of brewing parameters includes a temperature of the fluid, and wherein the automatically controlling includes automatically controlling the heating of the fluid. In some embodiments, the method further includes sensing a plurality of brewing parameters associated with the preparing of the wort and generating sense signals based on the sensed parameters; and automatically controlling the preparing of the wort based at least in part on the sense signals, wherein the plurality of brewing parameters includes a volumetric flow rate of the fluid, and wherein the automatically controlling includes automatically controlling the volumetric flow rate of the fluid.

In some embodiments, the method further includes removing the fluid from the cooking vessel and transferring the removed fluid to a fermentation tank. In some embodiments, the method further includes removing the fluid from the cooking vessel and transferring the removed fluid to a fermentation tank; and performing a clean-in-place (CIP) operation to clean the cooking vessel, the grain container, the plurality of sieves. In some embodiments, the method further includes providing one or more hops baskets, wherein the circulating of the fluid includes adding hops to the circulated fluid via the one or more hop baskets; removing the fluid from the cooking vessel and transferring the removed fluid to a fermentation tank; and performing a clean-in-place (CIP) operation to clean the cooking vessel, the grain container, the plurality of sieves, and the one or more hop baskets.

In some embodiments of the method, the circulating of the fluid includes circulating the fluid through stainless-steel liquid-transfer piping coupled between the drain of the cooking vessel and a location above the cooking vessel. In some embodiments, the circulating of the fluid includes centrifugally pumping the fluid.

In some embodiments of the method, the adding of the fluid to the cooking vessel includes adding more fluid than necessary to produce a target concentration of the wort.

In some embodiments, the method further includes providing a frame having a plurality of casters; and mounting the cooking vessel and the grain container on the frame.

In some embodiments, the present invention provides a computer-readable medium having instructions stored thereon for causing a suitably programmed computer to execute a method, the method including adding a fluid to a cooking vessel having a drain; heating the fluid in the cooking vessel; loading a grain bed and a plurality of sieves into a grain container having a false bottom such that the grain bed is separated by the plurality of sieves into a plurality of grain layers; placing the grain container into the cooking vessel; and circulating the fluid, wherein the circulating of the fluid includes transferring the fluid heated by the cooking vessel into the grain container such that the transferred fluid contacts a top surface of the grain bed, filters through the grain bed and the plurality of sieves, and enters the cooking vessel via the false bottom of the grain container, and re-circulating the fluid that exits the cooking vessel, via the drain, back to the top surface of the grain bed.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment). Further, some embodiments include fewer than all the components described as part of any one of the embodiments described herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," " "second," and "third," etc., are used merely as labels, and are not intended to impose numerical requirements on their objects.

What is claimed is:

1. A brewing system comprising:
   a cooking vessel configured to heat a liquid in the cooking vessel;
   a grain container having a false bottom, wherein the grain container is configured to hold a grain bed, wherein the grain container includes a plurality of sieves that are configured to separate the grain bed into a plurality of vertically stacked grain layers, wherein each of the plurality of sieves is configured to allow wort to pass through and to hold back residual grain, wherein the plurality of sieves includes a first sieve and a second sieve arranged directly above the first sieve, and wherein the plurality of grain layers includes a first grain layer supported by the first sieve and a second grain layer supported by the second sieve; and
   a liquid-circulation system configured to:
      transfer the liquid heated by the cooking vessel directly into the grain container such that the transferred liquid contacts a top surface of the grain bed, filters through the grain bed and the plurality of sieves including through the second grain layer and the second sieve and then directly through the first grain layer and the first sieve,
      transfer the liquid that filtered through the grain bed and the plurality of sieves out of the grain container such that the liquid exits the grain container through the false bottom of the grain container, and
      transfer the liquid that exited through the false bottom of the grain container into the cooking vessel.

2. The brewing system of claim 1, wherein the liquid-circulation system is further configured such that the liquid has a laminar flow as it filters through the grain bed and the plurality of sieves.

3. The brewing system of claim 1, wherein the liquid-circulation system includes a sparging device configured to sparge the liquid onto a top surface of the grain bed.

4. The brewing system of claim 1, wherein the cooking vessel includes an electrical heating element configured to heat the liquid in the cooking vessel.

5. The brewing system of claim 1, wherein the plurality of sieves further includes a third sieve, and wherein the plurality of sieves is configured to be stacked together in the grain container such that the first sieve is placed in contact with the false bottom of the grain container, the second sieve is stacked on the first sieve, and the third sieve is stacked on the second sieve.

6. The brewing system of claim 1, wherein the grain container is further configured to be placed in the cooking vessel.

7. The brewing system of claim 1, wherein the liquid-circulation system includes:
a centrifugal pump, and
a variable-frequency drive operatively coupled to the centrifugal pump and configured to provide variable speed flow rates for the liquid circulated by the liquid-circulation system.

8. The brewing system of claim 1, further comprising:
a plurality of sensors configured to sense parameters in the brewing system and generate sense signals based on the sensed parameters;
a plurality of brewing control devices; and
a controller operatively coupled to the plurality of brewing control devices and operatively coupled to the plurality of sensors, wherein the controller is configured to automatically control the brewing control devices based at least in part on the sense signals.

9. The brewing system of claim 1, further comprising a cooling device operatively coupled to the liquid-circulation system and configured to cool the liquid circulated by the liquid-circulation system.

10. The brewing system of claim 1, further comprising one or more hop baskets operatively coupled to the liquid-circulation system and configured to add hops to the liquid circulated by the liquid-circulation system.

11. The brewing system of claim 1, wherein the first grain layer and the second grain layer are maintained stationary relative to the grain container.

12. The brewing system of claim 1, wherein the grain container and the cooking vessel are arranged such that the transfer of the liquid that exited through the false bottom of the grain container into the cooking vessel includes dropping the liquid from the grain container directly into the cooking vessel.

13. The brewing system of claim 1, further comprising a frame that includes a plurality of casters, wherein the cooking vessel, the grain container, and the liquid-circulation system are each mounted to the frame such that the brewing system is configured to be portable.

* * * * *